(12) United States Patent
Månsson et al.

(10) Patent No.: US 12,374,970 B2
(45) Date of Patent: Jul. 29, 2025

(54) STATOR

(71) Applicant: BorgWarner Sweden AB, Landskrona (SE)

(72) Inventors: Christian Månsson, Lund (SE); Per Söderberg, Lund (SE); David Leksell, Lund (SE)

(73) Assignee: BORGWARNER SWEDEN AB, Landskrona (SE)

( * ) Notice: Subject to any disclaimer, the term of this patent is extended or adjusted under 35 U.S.C. 154(b) by 0 days.

(21) Appl. No.: 17/050,012

(22) PCT Filed: Apr. 25, 2019

(86) PCT No.: PCT/EP2019/060618
§ 371 (c)(1),
(2) Date: Oct. 23, 2020

(87) PCT Pub. No.: WO2019/207047
PCT Pub. Date: Oct. 31, 2019

(65) Prior Publication Data
US 2021/0119516 A1    Apr. 22, 2021

(30) Foreign Application Priority Data

Apr. 25, 2018 (SE) .................................. 1850496-9

(51) Int. Cl.
| | |
|---|---|
| *H02K 1/14* | (2006.01) |
| *H02K 3/52* | (2006.01) |
| *H02K 15/022* | (2025.01) |
| *H02K 15/10* | (2006.01) |
| *H02K 15/12* | (2006.01) |

(52) U.S. Cl.
CPC ........... *H02K 15/022* (2013.01); *H02K 1/148* (2013.01); *H02K 3/522* (2013.01); *H02K 15/10* (2013.01); *H02K 15/12* (2013.01)

(58) Field of Classification Search
CPC .............................. H02K 1/148; H02K 3/522
See application file for complete search history.

(56) References Cited

U.S. PATENT DOCUMENTS 9,543,794 B2 *  1/2017  In ............................ H02K 1/165
9,748,810 B2     8/2017  Okinaga et al.
(Continued)

FOREIGN PATENT DOCUMENTS

| CN | 101546933 A | 9/2009 |
|----|-------------|--------|
| EP | 1528655 A2  | 5/2005 |

(Continued)

*Primary Examiner* — Livius R. Cazan
(74) *Attorney, Agent, or Firm* — DILWORTH IP, LLC

(57) ABSTRACT

A stator (1) is provided, comprising a lamination stack (10) having a plurality of segments (20) being connected to each other by means of respective folding joints (30), wherein at least one folding joint (30) is arranged radially inwards of a virtual circumference (27) corresponding to the maximum radius (R2) of the lamination stack (10). The stator (1) further comprises a plurality of insulators (40), wherein at least one insulator (40) comprises an end part (48, 49) extending axially out from the lamination stack (10), and wherein a radial space is provided between the outer circumference of the end part (48, 49) and the outer periphery of the laminator stack (10).

12 Claims, 5 Drawing Sheets

(56) References Cited

U.S. PATENT DOCUMENTS

| | | | |
|---|---|---|---|
| 2004/0222715 A1* | 11/2004 | Yamamura | H02K 15/095 310/216.015 |
| 2011/0020154 A1* | 1/2011 | Matsuda | H02K 3/325 310/43 |
| 2012/0019093 A1* | 1/2012 | Maki | H02K 1/148 310/216.013 |
| 2012/0319512 A1 | 12/2012 | Nakagawa | |
| 2013/0199249 A1 | 8/2013 | In et al. | |
| 2014/0035428 A1 | 2/2014 | Yuya et al. | |
| 2014/0300242 A1* | 10/2014 | Honda | H02K 15/12 310/216.009 |
| 2015/0035397 A1 | 2/2015 | Okinaga et al. | |

FOREIGN PATENT DOCUMENTS

| | | |
|---|---|---|
| EP | 2144348 A1 | 1/2010 |
| JP | 2010288439 A | 12/2010 |
| JP | 2011030328 A | 2/2011 |
| JP | 2011067055 A | 3/2011 |
| JP | 2011205875 A | 10/2011 |
| KR | 1020130118955 A | 10/2013 |
| WO | 2013136646 A1 | 9/2013 |

\* cited by examiner

STATOR

This application claims the benefit of Swedish Application No. 1850496-9 filed Apr. 25, 2018 and PCT Application No. EP2019/060618 filed Apr. 25, 2019.

TECHNICAL FIELD

The present invention relates to a stator, as well as to a lamination stack, and in particular to a lamination stack forming part of a stator of a brushless DC motor. The present invention also relates to an electric motor having such stator.

BACKGROUND

In brushless DC motors the stator may be manufactured by a lamination stack being provided with a plurality of windings. When forming part of the motor, the lamination stack exhibits a cylindrical shape.

The stator may however be manufactured by arranging the lamination stack in a linear shape, whereby the windings are wound and arranged onto the lamination stack. The lamination stack is thereafter folded to form a cylindrical shape, whereby its ends are welded together.

Stator performance is dependent on the arrangement of the windings relative the lamination stack. Therefore, great care needs to be taken with respect to positioning of the windings in order to optimize the motor characteristics. However, it is also important to reduce the size of the electric motor, and especially to minimize the size for a particular motor, without reducing motor performance.

SUMMARY

It is an object of the present invention to mitigate the drawbacks mentioned above, and to provide an improved lamination stack, as well as an improved stator. In particular, it is an object of the present invention to provide for a more space-efficient electrical motor.

According to a first aspect, a stator is provided. The stator comprises a lamination stack having a plurality of segments being connected to each other by means of respective folding joints, wherein at least one folding joint is arranged radially inwards of a virtual circumference corresponding to the maximum radius of the lamination stack. The stator further comprises a plurality of insulators, wherein at least one insulator comprises an end part extending axially out from the lamination stack, and wherein a radial space is provided between the outer circumference of the end part and the outer periphery of the laminator stack.

According to a second aspect, a stator is provided. The stator comprises a lamination stack having a plurality of segments being connected to each other by means of folding joints, wherein at least one folding joint is arranged at a portion of the segment having a specific thickness extending between a radius (R1) of an inner surface and a radius (R2) of an outer surface. Each folding joint is arranged at a radial position (R3) between $(R1+0.3*(R2-R1))$ and $(R1+0.9*(R2-R1))$. The stator further comprises a plurality of insulators, wherein at least one insulator comprises an end part extending axially out from the lamination stack, and wherein a radial space is provided between the outer circumference of the end part and the outer periphery of the laminator stack.

In an embodiment, each folding joint is arranged at a radial position between $(R1+0.5*(R2-R1))$ and $(R1+0.7*(R2-R1))$.

By arranging the folding joints at a reduced radius will in fact provide for an increased tension in phase windings arranged onto an insulator end part, as will be described further below.

In the following, some preferred embodiments will be briefly discussed—these embodiments are equally applicable for the first and second aspect.

The stator may further comprise a plurality of windings, wherein at least one phase winding is arranged in the radial space between the outer circumference of the rear end part and the outer periphery of the laminator stack. As the phase winding(s) are arranged radially inside the outer circumference of the lamination stack, a reduced size of the electrical motor is possible.

The stator may further comprise a lead frame, wherein a cylindrical wall of said lead frame may be arranged in the radial space between the outer circumference of the rear end part and the outer periphery of the laminator stack.

The cylindrical wall of the lead frame is preferably arranged radially outside said at least one phase winding. This allows for a more compact stator, and consequently also a more compact motor.

The stator may further comprise a front cover, which is arranged at a front end of the stator. Preferably, a radial seal of said front cover is arranged in the radial space between the outer circumference of the front end part and the outer periphery of the laminator stack. This provides for an efficient, and compact, sealing to a motor housing.

At least one insulator is formed by a rear insulator member and a front insulator member. This facilitates not only manufacturing of the insulator, but also mounting of the windings to the lamination stack.

The radial position of at least one (preferably each) folding joint coincides with the radius of the outer circumference of the rear end part, especially at the axial end part of the rear end part.

According to a third aspect, an electrical motor is provided. The motor comprises a stator according to any of the first or second aspect.

According to a further aspect, a lamination stack for a stator is provided. The lamination stack comprises a plurality of segments being connected to each other by means of folding joints, wherein the folding joint is arranged radially inwards of a virtual circumference corresponding to the maximum radii of the lamination stack.

According to a yet further aspect, a lamination stack for a stator is provided. The lamination stack comprises a plurality of segments being connected to each other by means of folding joints, wherein each folding joint is arranged at a portion of the segment having a specific thickness extending between a radii of an inner surface and a radii of an outer surface, and wherein each folding joint is arranged at a radial position between $(R1+0.3*(R2-R1))$ and $(R1+0.9*(R2-R1))$.

Each folding joint may be arranged at a radial position between $(R1+0.5*(R2-R1))$ and $(R1+0.7*(R2-R1))$.

BRIEF DESCRIPTION OF DRAWINGS

The invention will be described in further detail below under reference to the accompanying drawings, in which.

DETAILED DESCRIPTION

Figure 1:
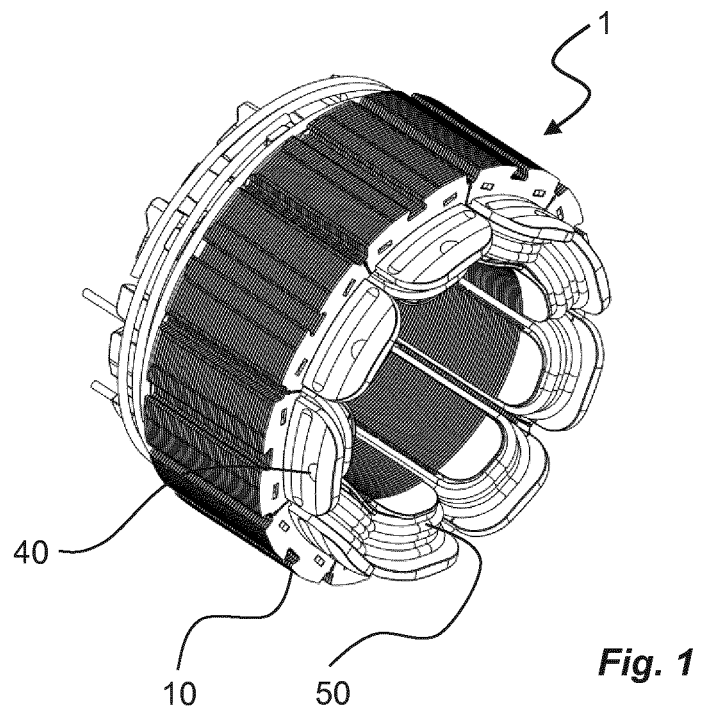
FIG. 1 is an isometric view of a stator according to an embodiment.

In FIG. 1 a stator 1 is shown. The stator 1, which is intended to form part of a brushless DC motor, comprises a lamination stack 10 which is formed into a cylindrical shape. A plurality of insulators 40 are distributed at the inner periphery of the lamination stack 10, and each insulator 40 carries a coil or winding 50. In the shown example, there are nine insulators 40, and consequently there are nine windings 50.

Figure 2:
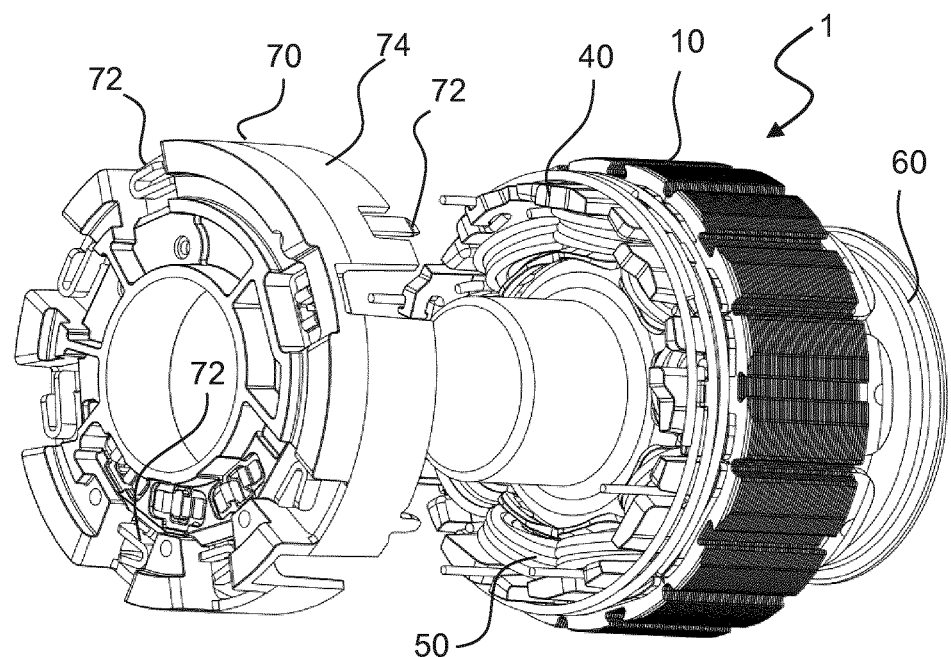
FIG. 2 is an exploded isometric view of the stator of FIG. 1, including a lead frame and a rotor.

In FIG. 2 mounting of the stator 1 is shown. A rotor housing 60 is arranged inside the stator 1, i.e. radially inwards of the insulators 40 and the respective coils 50. On the rear side of the stator 1 a lead frame 70 is provided. The lead frame 70 forms an axial end piece to the motor, and is provided with a plurality of metal structures and electrical components 72 in order to allow the windings 50 to be connected to an external power supply (not shown).

Figure 3:
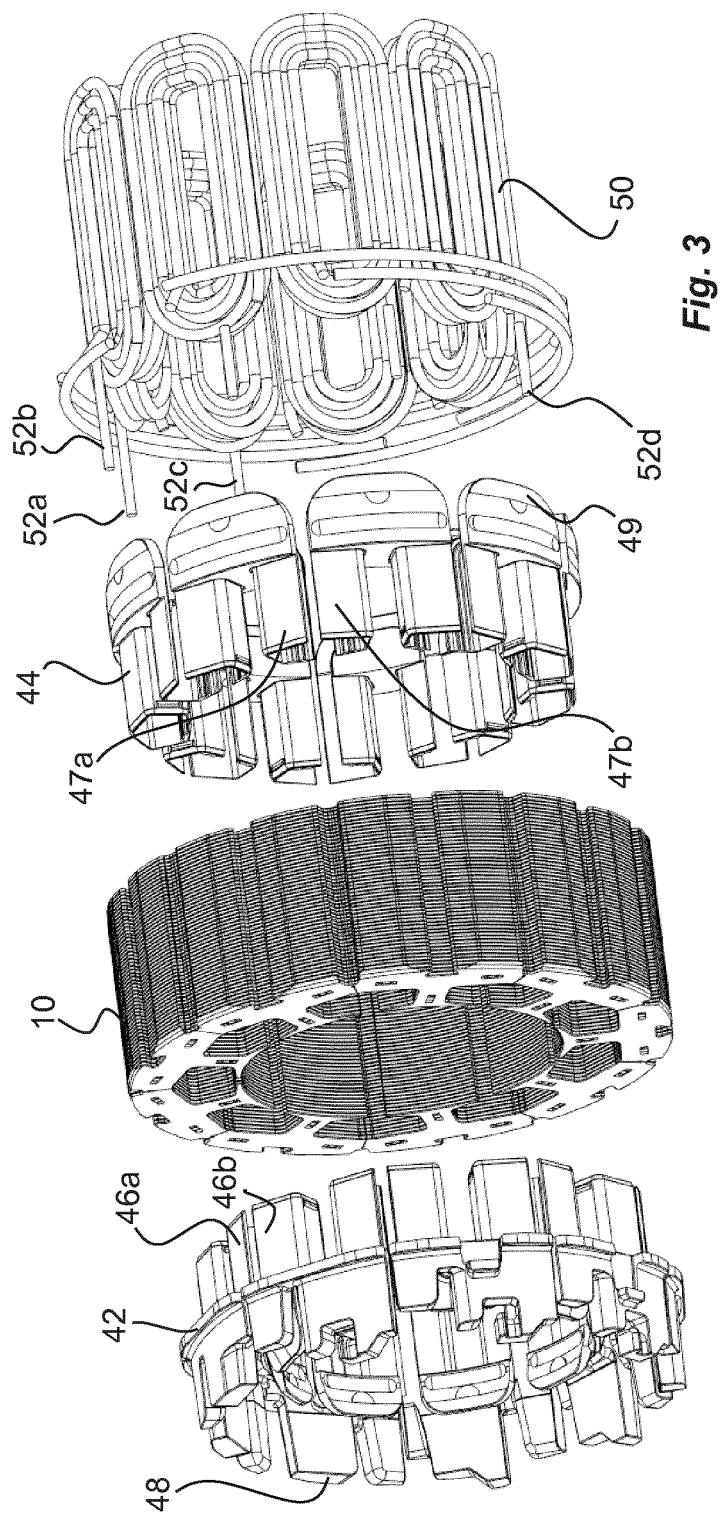
FIG. 3 is an exploded view of the stator shown in FIGS. 1 and 2.

Details of the stator 1 are shown in further detail in FIG. 3. In particular, each insulator 40 is formed by a front insulator member 44 and a rear insulator member 42. The front insulator member 44 is pushed into the lamination stack 10 from the front side, while the rear insulator member 42 is pushed into the lamination stack 10 from the rear side. As can be seen in FIG. 3 each front insulator member [42] 44 has two legs [46a] 47a, [46b] 47b extending from a front end part 49, while each rear insulator member 42 has two legs 46a, 46b extending from a rear end part 48. Each leg 46a-b, 47a-b is V-shaped in order to accommodate the winding 50. For each insulator member 42, 44, the legs 46a-b, 47a-b are facing each other such that the V-shapes have their respective opening facing each other. This means that each winding 50 will be wound around first legs 46a. 47a of two aligned insulator members 42, 44, and second legs 46b, 47b of two adjacent aligned insulator members 42, 44.

As is further shown in FIG. 3, the windings 50 terminate in a number of phase windings 52a-d which are extending to lie in parallel to each other along the outer periphery of the rear end parts 48 of the rear insulator members 42.

Figure 4:
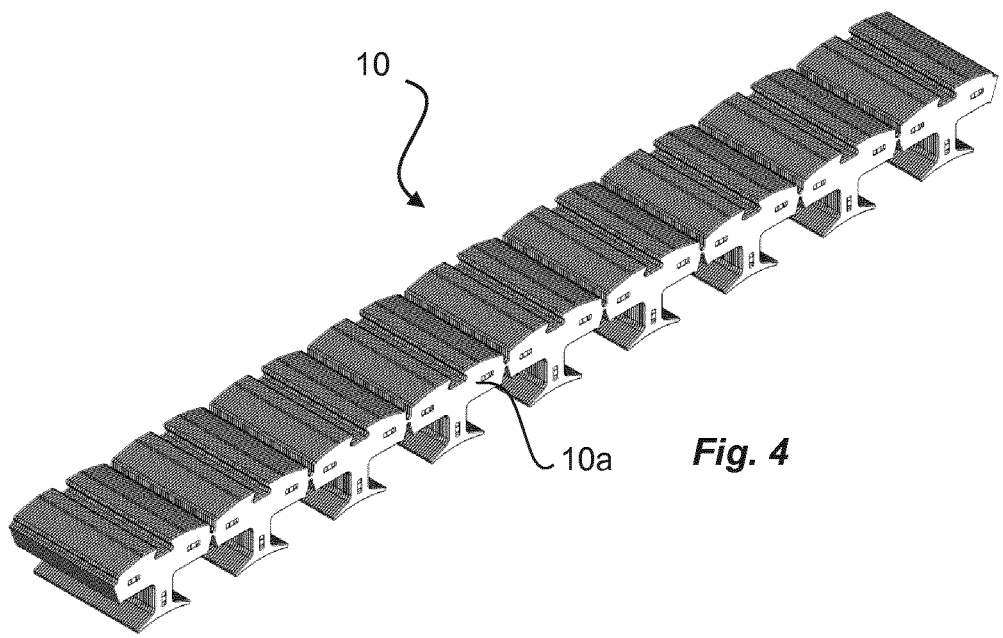
FIG. 4 is an isometric view of a lamination stack according to an embodiment.

The lamination stack 10 is formed by a plurality of linear metal sheet laminas 10a, stacked on top of each other as indicated in FIG. 4. The number of laminas 10a will depend on motor performance and other design criteria; however a typical number of laminas 10a, for a motor suitable for vehicle and automotive applications, is in the range of 10-100, such as in the range of 20-80, preferably in the range of 40-60.

Each lamina 10a, and thereby the entire lamination stack 10, forms a linear array of a plurality of consecutive T-shaped segments 20. Each segment 20 is connected to adjoining segments 20 by means of a folding joint 30, shown in FIG. 5. For each T-shaped segment 20, a stem or tee 22 protrudes radially inwards (reference to the radial direction when the lamination stack 10 is folded into a cylindrical shape) from a yoke 24 and is used to mount the insulator members 42, 44 to the lamination stack 10.

Figure 5:
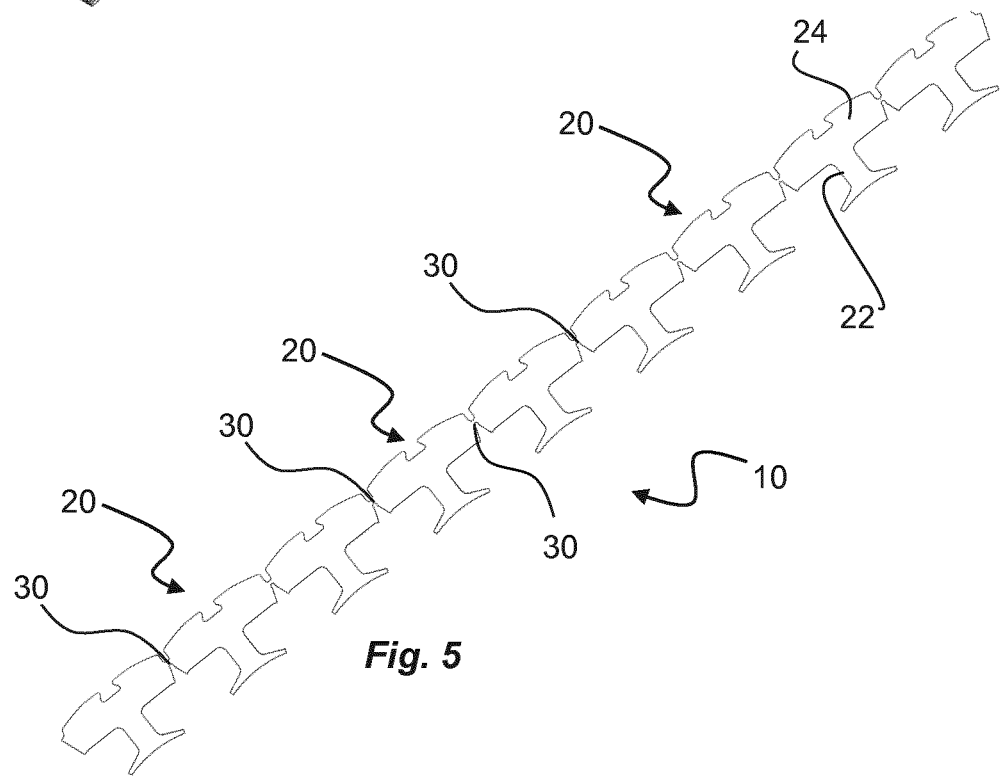
FIG. 5 is a side view of the lamination stack shown in FIG. 4.

During manufacturing, the lamination stack 10 is formed in a linear shape as indicated in FIGS. 4-5. The insulators 40 and windings 50 are mounted to the linear lamination stack before the entire assembly is folded into a cylindrical shape. In these figures the lamination stack 10 is shown at a manufacturing step prior to assembly of the insulating members 40 and the respective windings 50.

Figure 6:
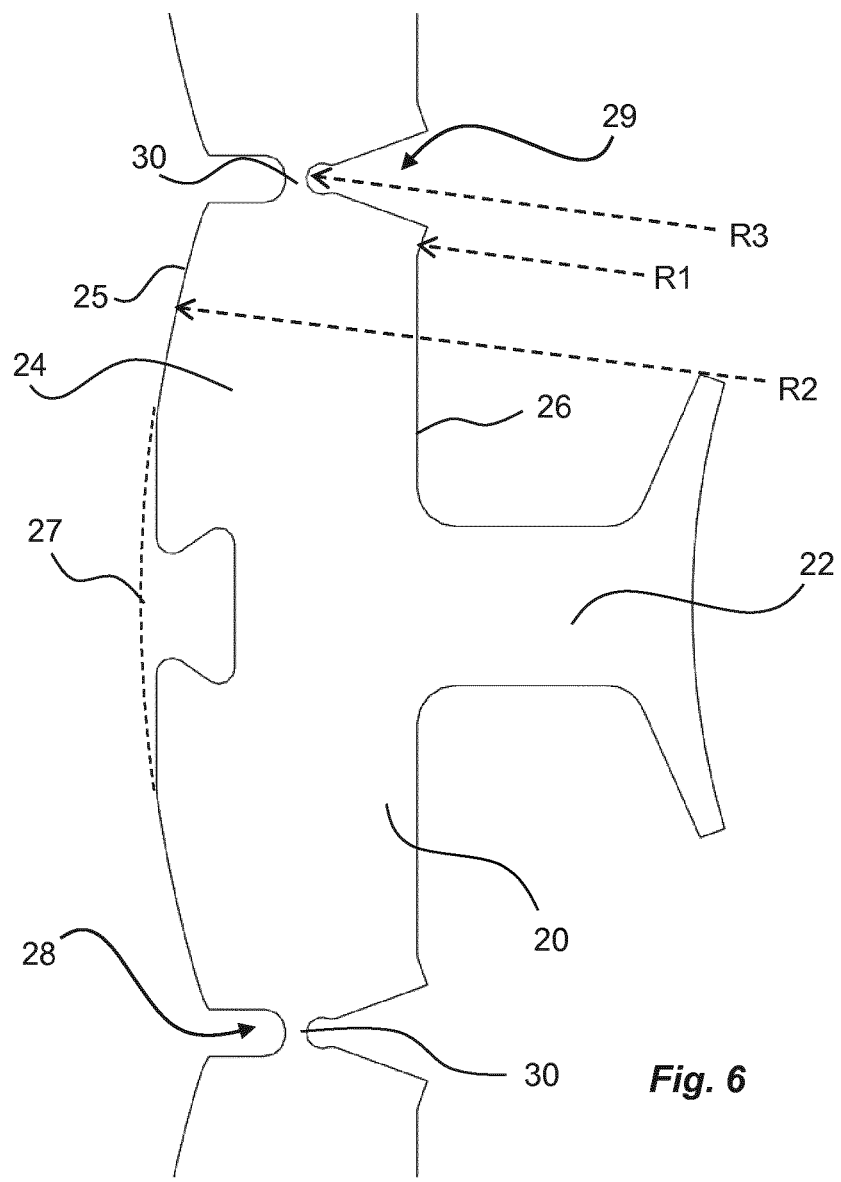
FIG. 6 is an enlarged view of a segment of the lamination stack shown in FIG. 5.

A segment 20 of the lamination stack 10 is shown in further details in FIG. 6. The segment 20 has a radially outer surface 25 and a radially inner surface 26, defined by the radial thickness of the yoke 24. The inner surface 26 and the outer surface 25 meet at a folding joint 30; at the folding joint 30 the radial distance between the inner surface 26 and the outer surface 25 is at its minimum.

In order to improve winding of the coils/windings 50, the folding joint 30 should be arranged radially inwards of a virtual circumference 27 corresponding to the maximum radii of the lamination stack 10, when assembled in the cylindrical shape.

This means that the folding joint 30 between two adjacent segments 20 of the lamination stack 10 is formed as a depression 28 at the outer surface 25 and a circumferentially aligned depression 29 at the inner surface 26, preferably at an axial extension corresponding to the entire width of the lamination stack 10. The outer depression 28 is U-shaped, while the inner depression 29 is shaped as a key hole.

The folding joint 30 is preferably arranged at a portion of the segment 20 having a specific thickness extending between the radii R1 of the inner surface 26 and the radii R2 of the outer surface 25 (rather of the virtual circumference 27); the folding joint 30 is then preferably arranged at a radial position R3 between (R14+0.3*(R2−R1)) and (R1+0.9*(R2−R1)), more preferably between (R1+0.5*(R2−R1)) and (R1+0.7*(R2-R1)).

By arranging the folding joints 30 radially inwards of the virtual circumference 27, increased tension of the phase windings 52a-d will be provided when the entire stator 1 is folded into its cylindrical shape. As already have been explained, the windings 50 terminate in a number of phase windings 52a-d which are extending to lie in parallel to each other along the outer periphery of the rear end parts 48 of the rear insulator members 42. By arranging the folding joints 30 and the phase windings 52a-d at the same (or essentially the same) radius there will be a minimum slack in the phase windings 52a-b, thereby improving robustness of the entire motor as the position of the phase windings 52a-d is fixated.

Figure 7:
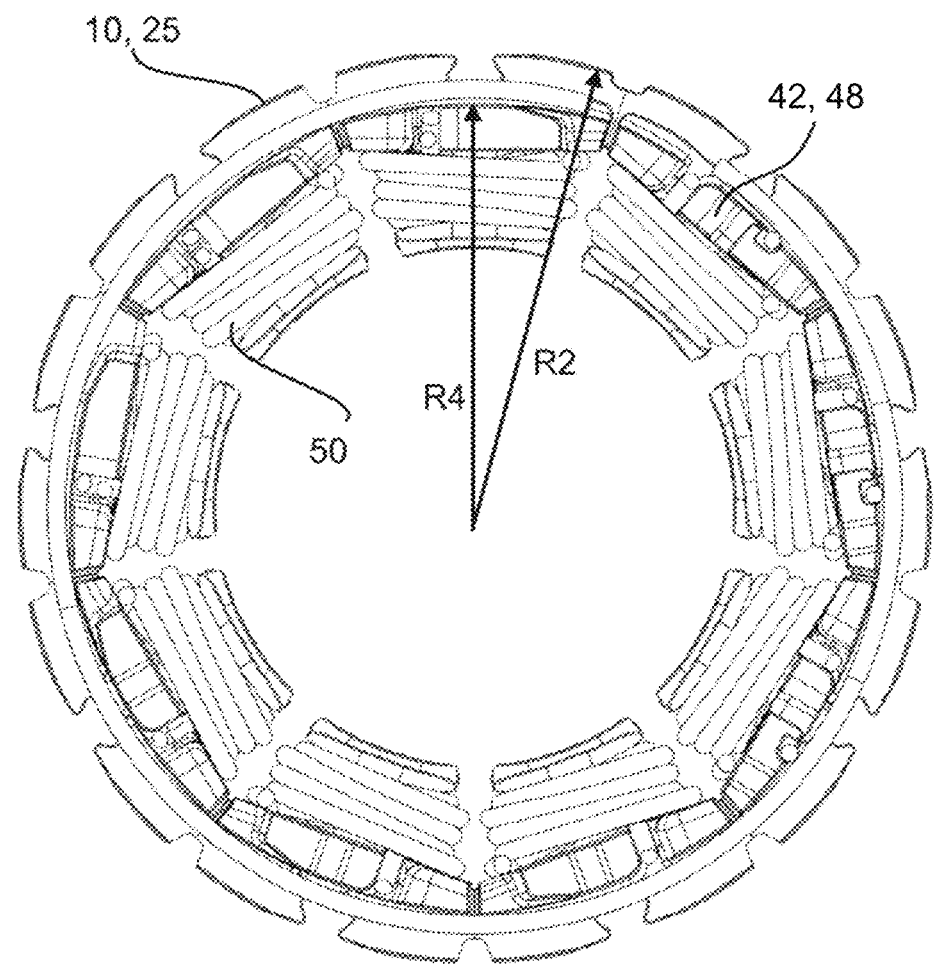
FIG. 7 is a side view of the stator shown in FIG. 1.

A side view of the stator 1 is shown in FIG. 7. As is clear front the figure, the lamination stack 10 has been folded into a cylindrical shape; consequently, the inner depressions 29 have been compressed such that adjacent yokes 24 meet at the area of the inner depression 29. Alternatively, adjacent yokes 24 are at least arranged very close to each other. The outer periphery of the insulator 40, in particular the outer periphery of the rear end part 48 of the rear insulator member 42 is arranged at a radius R4. Radius R4 is preferably measured at the axial end of the rear insulator member 42. It should be noted that since the rear end part 48 is essentially planar, the radius R4 is not constant. However, the radius R2 (which is constant, especially when indicating the radius of the virtual circumference 27) should always be greater than the radius R4, preferably always greater than 1 mm, such that the difference between radius R2 and radius R4 is between 1 and 2 mm. The difference between radius R2 and radius R4 can in some embodiments depend on the wire diameter; in case of a wire diameter of 0.9 mm, the difference between radius R2 and radius R4 can be between 1.17 and 2.25 mm, i.e. between 1.3 and 2.5 times the wire diameter.

Figure 8:
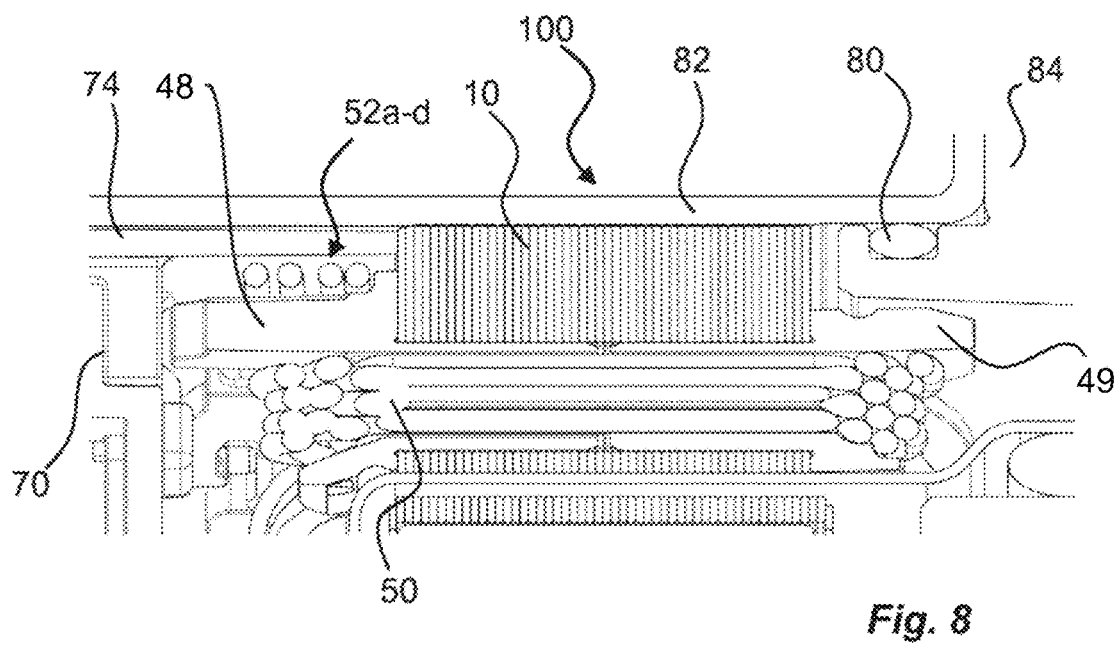
FIG. 8 is a cross-sectional view of parts of an electrical motor, including the stator shown in FIG. 1.

The radial space provided between the outer circumference of the rear end part 48 and the outer periphery of the laminator stack 10 is preferably used for accommodating the phase wires 52*a-d*, as indicated in FIG. 8. FIG. 8 shows parts of an electrical motor 100, including the stator 1 described above. However, the inventor has also surprisingly realized that the same radial space can also be used for connecting the lead frame 70. In FIG. 8 (as well as in FIG. 2) it can be seen how the lead frame 70 is provided with cylindrical side walls 74 extending towards the stator 1 from the outer periphery of the circular lead frame 70. These cylindrical side walls 74, which is also provided with one or more leads 72, are inserted onto the insulators 40 such that the side walls 74 fit in the radial space between the outer circumference of the rear end part 48 and the outer periphery of the laminator stack 10.

Yet further, a similar radial space is provided at the front side, i.e. between the outer circumference of the front end part 49 and the outer periphery of the laminator stack 10. Although this radial space is not used for accommodating phase wires 52*a-d*, it is instead configured to allow for a radial seal 80 between a cylindrical housing 82 and a front motor cover 84.

The combination of the position of the folding joint 30 at the reduced radius R3 and the radial space provided between the outer circumference of the end parts 48, 49 and the outer periphery of the laminator stack 10 is thereby highly advantageous in that it does not only allows for an extremely space efficient connection of the lead frame 70 to the stator 1, but it also allows for a very space efficient mounting of a radial seal between the front cover 84 and the motor housing 82.

The invention claimed is:

1. A stator, comprising a lamination stack having a plurality of segments being connected to each other by means of respective folding joints, wherein at least one folding joint is arranged entirely radially inwards of a virtual circumference corresponding to a maximum radius of the lamination stack when assembled in a cylindrical shape, the at least one folding joint being formed integrally with respective segments of the lamination stack, wherein the stator further comprises a plurality of insulators, wherein at least one insulator comprises an end part extending axially out from the lamination stack, and wherein a radial space is provided between an outer circumference of the end part and an outer periphery of the lamination stack, wherein a radial position of at least one folding joint coincides with a radius of the outer circumference of the end part.

2. A stator, comprising a lamination stack having a plurality of segments being connected to each other by means of folding joints, wherein at least one entire folding joint is arranged at a portion of a segment having a specific thickness extending between a radius R1 of an inner surface and a radius R2 of an outer surface, wherein each folding joint is arranged at a radial position R3 between (R1+0.3*(R2−R1)) and (R1+0.9*(R2−R1)), wherein the stator further comprises a plurality of insulators, wherein at least one insulator comprises an end part extending axially out from the lamination stack, and wherein a radial space is provided between an outer circumference of the end part and an outer periphery of the lamination stack when assembled in a cylindrical shape, wherein the at least one entire folding joint is formed integrally with respective segments of the lamination stack.

3. The stator according to claim 2, wherein each folding joint is arranged at the radial position R3 between (R1+0.5*(R2−R1)) and (R1+0.7*(R2−R1)).

4. The stator according to claim 2, wherein the radial position R3 coincides with a radius of the outer circumference of the end part.

5. The stator according to claim 1, further comprising a plurality of windings, wherein at least one phase winding is arranged in the radial space between the outer circumference of the end part and the outer periphery of the lamination stack.

6. The stator according to claim 1, further comprising a lead frame, wherein a cylindrical wall of said lead frame is arranged in the radial space between the outer circumference of a rear end part and the outer periphery of the lamination stack.

7. The stator according to claim 1, wherein a cylindrical wall of a lead frame is arranged radially outside a phase winding.

8. The stator according to claim 1, further comprising a front cover arranged at a front end of the stator.

9. The stator according to claim 8 wherein a radial seal of said front cover is arranged in the radial space between the outer circumference of a front end part and the outer periphery of the lamination stack.

10. The stator according to claim 1, wherein the at least one insulator is formed by a rear insulator member and a front insulator member.

11. An electrical motor, comprising a stator according to any of claim 10.

12. A stator, comprising a lamination stack having a plurality of segments being connected to each other by means of respective folding joints, wherein at least one folding joint is arranged entirely radially inwards of a virtual circumference corresponding to a maximum radius of the lamination stack when assembled in a cylindrical shape, the at least one folding joint being formed integrally with respective segments of the lamination stack, wherein the stator further comprises a plurality of insulators, wherein at least one insulator comprises an end part extending axially out from the lamination stack, and wherein a radial space is provided between an outer circumference of the end part and an outer periphery of the lamination stack, wherein the stator further comprises a plurality of windings, wherein at least one phase winding is arranged in the radial space between the outer circumference of a rear end part and the outer periphery of the lamination stack, wherein the folding joints and the phase windings are arranged at a same radius.

* * * * *